3,042,493
PROCESS FOR RE-USING CARRIER BODY HOLDERS EMPLOYED IN THE PYROLYTIC PRECIPITATION OF SILICON
Konrad Reuschel, Pretzfeld, and Norbert Schink, Erlangen, Germany, assignors to Siemens-Schuckertwerke Aktiengesellschaft, Berlin-Siemensstadt, Germany, a German corporation
Filed Mar. 1, 1961, Ser. No. 92,562
Claims priority, application Germany Mar. 2, 1960
7 Claims. (Cl. 23—223.5)

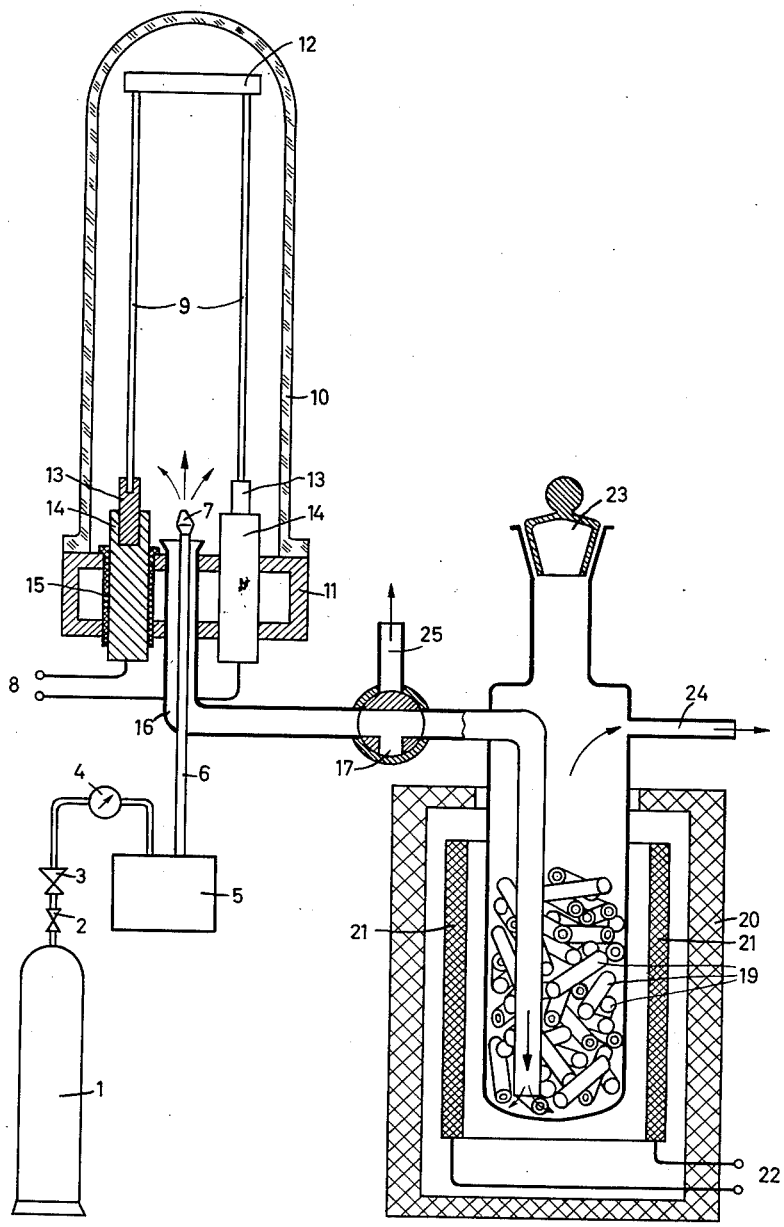

Our invention relates to the pyrolytic production of hyperpure semiconductor material, particularly silicon, for electronic purposes.

According to a known pyrolytic method (German Patent 1,061,593), the semiconductor material is obtained by chemical reaction and precipitation from a gaseous compound of the same material with the aid of a carrier gas which acts as a reducing agent. For this purpose, a carrier body, consisting of the same material as the one to be precipitated, is mounted within a reaction vessel and is directly heated by passing electric current therethrough, the carrier body being fastened between holders of pure carbon such as spectral carbon or hyperpure graphite.

The carbon holders between which the carrier body is accommodated during the pyrolytic process often contain traces of impurities, particularly metal oxides and phosphates, which during the precipitation process, at high temperature, may enter into the precipitated semiconductor material partly by diffusion directly from the carbon and partly by being dissolved out of the carbon by the reaction gas mixture so that they become embedded in the semiconductor material being precipitated. Such impurities tend to act as doping agent upon the precipitated semiconductor material and for that reason are often undesired.

It is an object of our invention to eliminate such deficiencies.

According to our invention we subject the carbon holders, prior to using them in the pyrolytic reaction vessel in the above-described manner, to the action of the waste gases issuing from the same reaction process. According to a more specific feature this is done while the carbon holders are in heated condition, preferably at a temperature of approximately 600° C.

In accordance with another feautre of our invention, the just-mentioned treatment of the carbon holders is effected by accommodating such holders in a waste-gas conduit or separate container traversed by the residual gases coming from the pyrolytic reaction vessel.

An apparatus applicable in accordance with the invention for the production of hyperpure silicon will be described by way of example with reference to the accompanying drawing, the same process and apparatus being also applicable for producing other semiconductor materials, for example germanium, $A^{III}B^V$ semiconductor compounds such as indium antimonide (InSb), or silicon carbide (SiC).

The hydrogen gas, to be used as a carrier and reagent, is supplied from a gas cylinder 1 through a check valve 2, a multi-stage pressure reduction valve 3 and a gas-flow meter 4, and passes into an evaporator 5 in which a liquid silicon compound, for example silicochloroform $SiHCl_3$ or silicon tetrachloride $SiCl_4$, is being evaporated. In the evaporator the hydrogen becomes mixed with the evaporated silicon halide, and the mixture passes into the reaction vessel through a pipe 6 and a nozzle 7 which imparts a turbulent flow to the gas flow. Vertically mounted in the reaction vessel are two or more thin and elongated carrier rods 9 consisting of hyperpure silicon. The carrier rods are heated by passing electric current through the rods. For this purpose the rods are connected with current-supply terminals 8 to be energized from a suitable voltage source.

The reaction vessel in which the self-supporting carrier rods 9 are mounted comprises an hermetically sealed quartz bell 10, and a metallic closure 11 which forms a bottom and supporting structure for the bell. The upper ends of the two rods 9 are connected with each other by a bridge 12 of silicon which conducts the electric heating current from one to the other rod. Each rod 9 is inserted into the bore of a holder 13 consisting of spectral carbon. Each holder is mounted in a cylindrical metallic terminal structure 14 which extends through the closure 11 to the outside. The carbon holders 13 are firmly joined with the respective terminals 14 to provide for good electrical conductance, the fastening being effected, for example, by screwing the holders 13 into respective threaded sockets of the terminals 14. One of the two terminals 14 is insulated from the holder structure 11 by an insulating sleeve 15.

During pyrolytic operation, the residual gases pass from the reaction vessel through an outlet conduit 16 and a three-way valve 17 into another quartz vessel 18. A supply of carbon holders 19 is placed in vessel 18 in order to be pretreated for subsequent use in the pyrolytic reaction vessel. The quartz vessel 18 is mounted within a furnace 20 electrically heatable by heating coils 21 which are connected to terminals 22 for the supply of heating current. The quartz vessel 18 is gas-tightly sealed by a stopper 23. The reaction waste gases issue from the supply conduit 16 near the bottom of vessel 18 and flow about the holders 19 in the vessel which are thus heated by the waste gases. The waste gases ultimately leave the equipment through an outlet nipple 24.

The escaping waste gas passing through vessel 18 dissolve and remove impurities from the carbon holders 19. The waste gases, aside from various silanes, for example monochlorsilane $SiH_3Cl$ of trisiliconoctachloride $Si_3Cl_8$ and hydrochloric acid, also contain a residual amount of unspent reaction gas, for example silicochloroform $SiHCl_3$, and hydrogen. Under the effect of these gases, the metal oxides contained in the carbon are converted to fugitive chlorides and are cracked by the gas current. For example magnesium phosphate $Mg_3(PO_4)_2$ is cracked into magnesium chloride $MgCl_2$ and phosphoric acid $H_3PO_4$. The reaction products are eliminated together with the gas flow.

We have found it to be preferable to heat the carbon holders 19 in vessel 18 to a temperature in the neighborhood of 600° C. Since the pyrolytic precipitation temperature in the reaction vessel is above 900° C., for example about 1200° C., the escaping waste gases to which the holders 19 are subjected may suffice for heating them to the desired temperature. In cases where this is not sufficient, for example when the outlet conduit 16 is relatively long, the furnace 20 is preferably used for providing the necessary temperature.

The purifying effect of the waste gases is nearly independent of their temperature.

Even at room temperature, the waste gases have a purifying effect. The upper limit for the temperature of the waste gases can be stated as being approximately 800° C. The lowest applicable temperature is determined by the dew point of the waste gases which, depending upon the concentration of the silicon halide therein, varies between about −20 and −50° C. The preferably suitable temperature ranges approximately 300 to 600° C.

We have further found it advantageous to perform the above-described pretreatment of the carbon holders for a period of at least 100 hours approximately. Tests have shown that, for example, the phosphorus content of the holders can be reduced from $3 \cdot 10^{-4}\%$ phosphorus down to $0.6 \cdot 10^{-4}\%$ by continuing the process the just-mentioned period of time. Higher processing temperatures permit shortening the processing time and lower temperatures require prolongation of the time.

We have found it to be particularly favorable if the above-described processing is performed intermittently and the holders, during the interrupting intervals, are subjected at room temperature to the effect of oxygen, for example of the atmospheric air. For example, the heater 21 can be de-energized upon termination of the processing period of 100 hours and the flow of waste gas can then be permitted to escape into the outlet conduit 25 by correspondingly turning the three-way valve 17. By opening of the stopper 23, air is given access to the holders 19 in vessel 18. This has the effect that the air and the oxygen contained therein diffuse into the carbon. When thereafter the vessel 18 is again sealed by means of the stopper 23 and the waste gases are again conducted through the valve 17 into the vessel 18, new silicon-oxygen compounds are formed in the carbon due to the action of the waste gases, and any impurities still contained in the carbon are again cracked into fugitive compounds. This intermittent process can be repeated several times, if desired.

While chlorine compounds have been referred to above as the starting materials for pyrolytic precipitation of silicon, the corresponding bromine and iodine compounds of silicon are also suitable, e.g. tribromsilane $SiHBr_3$, silicon tetrabromide $SiBr_4$, and silicon tetraiodide $SiI_4$. The corresponding temperature ranges for the heat treatment are approximately zero to 850° C. for $SiHBr_3$, 50 to 900° C. for $SiBr_4$, and 150 to 1000° C. for $SiI_4$. The preferable temperature ranges with these compounds are about from 300 to 600° C.

As the starting material for pyrolytic precipitation of germanium, a gaseous mixture of germanium tetrachloride $GeCl_4$ and hydrogen $H_2$ is used, for which a temperature range from about room temperature up to about 500° C. is suitable for treatment of the carbon holders.

We claim:

1. The method of producing hyperpure semiconductor material for electronic purposes by pyrolytic precipitation of said semiconductor material from a gaseous compound thereof, which comprises mounting within a reaction vessel a carrier body of the same semiconductor material between holders of carbon; heating said carrier body to a high temperature at which precipitation of semiconductor material from said gaseous compound takes place and introducing into said reaction vessel said gaseous compound together with a reduction gas while discharging the waste gases from the vessel; subjecting a supply of said holders to the effect of the waste gases leaving the reaction vessel to thereby remove metal oxide and phosphate impurities from the carbon of said latter holders; and thereafter using the purified holders to mount said carrier body in the reaction vessel for repeating the pyrolytic process.

2. The method of producing hyperpure semiconductor material for electronic purposes by pyrolytic precipitation of said semiconductor material from a gaseous compound thereof, which comprises mounting within a reaction vessel a carrier body of the same semiconductor material between holders of carbon; heating said carrier body to a high temperature at which precipitation of semiconductor material from said gaseous compound takes place and introducing into said reaction vessel said gaseous compound together with a reduction gas while discharging waste gases from the vessel; subjecting a supply of said holders under heated condition to the effect of the waste gases leaving the reaction vessel to thereby remove impurities from the carbon of said latter holders; and thereafter using the purified holders to mount said carrier body in the reaction vessel for repeating the pyrolytic process.

3. The method of producing hyperpure silicon for electronic purposes by pyrolytic precipitation of silicon from a gaseous silicon halide, which comprises mounting within a reaction vessel a carrier body of hyperpure silicon between holders of carbon; heating said carrier body to pyrolytic temperature above 900° C. for precipitating hyperpure silicon from the gaseous silicon halide and simultaneously introducing into said reaction vessel said silicon halide together with hydrogen and discharging the waste gases from the vessel; exposing a number of said holders to the hot waste gases leaving the vessel and thereby heating said latter holders for removing metal oxide and phosphate impurities therefrom; and thereafter using the purified holding structures to mount said carrier body in the reaction vessel for repeating the process.

4. The method of producing hyperpure semiconductor material for electronic purposes by pyrolytic precipitation of said semiconductor material from a gaseous compound thereof, which comprises mounting within a reaction vessel a carrier body of the same semiconductor material between holders of carbon; passing electric current between said holders through said carrier body to thereby heat said carrier body to a high temperature at which precipitation of semiconductor material from said gaseous compound takes place; introducing into said reaction vessel said gaseous compound simultaneously with a reduction gas and discharging the waste gases from the vessel; subjecting a spare supply of said holders under heated condition to the effect of the waste gases leaving the reaction vessel to thereby remove impurities from the carbon of said latter holders; and thereafter using the purified holders to mount said carrier body in the reaction vessel for repeating the pyrolytic process.

5. The method of producing hyperpure silicon for electronic purposes by pyrolytic precipitation of silicon from a gaseous silicon halide, which comprises mounting within a reaction vessel a carrier body of hyperpure silicon between holders of carbon; heating said carrier body to pyrolytic temperature above 900° C. for precipitating hyperpure silicon from the gaseous silicon halide; introducing into said reaction vessel said silicon halide simultaneously with hydrogen and discharging the waste gases from the vessel; subjecting spare holders intermittently to the hot waste gases leaving the reaction vessel, and subjecting the latter holders during the intervening periods to oxygen, whereby the carbon of the latter holders is liberated from impurities; and thereafter using the purified holders to mount the carrier in the reaction vessel.

6. The method of producing hyperpure silicon for electronic purposes by pyrolytic precipitation of silicon from a gaseous silicon halide, which comprises mounting within a reaction vessel a carrier body of hyperpure silicon between holders of carbon; heating said carrier body to pyrolytic temperature above 900° C. for precipitation of hyperpure silicon from the gaseous silicon halide; introducing into said reaction vessel said silicon halide simultaneously with hydrogen and discharging the waste gases from the vessel through a processing container and subjecting in said container a spare number of holders to the effect of the hot waste gases; additionally heating said holders in said container so as to maintain them at a temperature of about 600° C., whereby the carbon of the latter holders is liberated from impurities; and thereafter using the purified holders to mount the carrier in the reaction vessel.

7. The method of producing hyperpure silicon for electronic purposes by pyrolytic precipitation of silicon from a gaseous silicon halide, which comprises mounting within a reaction vessel a carrier body of hyperpure silicon between holders of carbon; heating said carrier body to pyrolytic temperature above 900° C. for precipitating hyperpure silicon from the gaseous silicon halide and simultaneously introducing into said reaction vessel said silicon halide together with hydrogen and discharging the waste gases from the vessel; exposing a number of said holders to the hot waste gases leaving the vessel and thereby heating said latter holders for at least 100 hours approximately at a temperature of about 600° C. for removing metal oxide and phosphate impurities therefrom; and thereafter using the purified holding structures to mount said carrier body in the reaction vessel for repeating the process.

No references cited.